United States Patent
Biswas et al.

(10) Patent No.: US 11,710,239 B2
(45) Date of Patent: Jul. 25, 2023

(54) METHOD, APPARATUS, AND SYSTEM USING A MACHINE LEARNING MODEL TO SEGMENT PLANAR REGIONS

(71) Applicant: HERE Global B.V., Eindhoven (NL)

(72) Inventors: Souham Biswas, Haryana (IN); Sanjay Kumar Boddhu, Aurora, IL (US)

(73) Assignee: HERE Global B.V., Eindhoven (NL)

( * ) Notice: Subject to any disclaimer, the term of this patent is extended or adjusted under 35 U.S.C. 154(b) by 161 days.

(21) Appl. No.: 17/094,501

(22) Filed: Nov. 10, 2020

(65) Prior Publication Data

US 2022/0148184 A1    May 12, 2022

(51) Int. Cl.
*G06T 7/00* (2017.01)
*G06T 7/11* (2017.01)
(Continued)

(52) U.S. Cl.
CPC ............... *G06T 7/11* (2017.01); *G06N 3/084* (2013.01); *G06N 3/088* (2013.01); *G06T 5/20* (2013.01);
(Continued)

(58) Field of Classification Search
CPC ............. G06T 7/11; G06T 2207/20016; G06T 2207/20081; G06T 2207/20084; G06T 2207/20024; G06T 7/136; G06N 3/0454; G06N 3/08; G06V 10/443; G06V 10/82; G06V 10/454; G06K 9/6267; G06K 9/629
See application file for complete search history.

(56) References Cited

U.S. PATENT DOCUMENTS

| 9,547,805 | B1 | 1/2017 | Erignac |
| 2010/0142805 | A1* | 6/2010 | Maxwell ............... G06V 10/273 382/199 |

(Continued)

OTHER PUBLICATIONS

H. Wang, C. Li, X. Zhen, W. Yang and B. Zhang, "Gaussian Transfer Convolutional Neural Networks," in IEEE Transactions on Emerging Topics in Computational Intelligence, vol. 3, No. 5, pp. 360-368, Oct. 2019, doi: 10.1109/TETCI.2018.2881225. (Year: 2019).*

(Continued)

*Primary Examiner* — Li Liu
(74) *Attorney, Agent, or Firm* — Ditthavong, Steiner & Mlotkowski

(57) ABSTRACT

An approach is provided for using a machine learning model for identifying planar region(s) in an image. The approach involves, for example, determining the model for performing image segmentation. The model comprises at least: a trainable filter that convolves the image to generate an input volume comprising a projection of the image at different resolution scales; and feature(s) to identify image region(s) having a texture within a similarity threshold. The approach also involves processing the image using the model by generating the input volume from the image using the trainable filter and extracting the feature(s) from the input volume to determine the region(s) having the texture. The approach further involves determining the planar region(s) by clustering the image regions. The approach further involves generating a planar mask based on the planar region(s). The approach further involves providing the planar mask as an output of the image segmentation.

20 Claims, 14 Drawing Sheets

(51) Int. Cl.
　　　*G06T 7/136*　　　(2017.01)
　　　*G06T 5/20*　　　(2006.01)
　　　*G06N 3/088*　　　(2023.01)
　　　*G06N 3/084*　　　(2023.01)

(52) U.S. Cl.
　　　CPC .... *G06T 7/136* (2017.01); *G06T 2207/20016* (2013.01); *G06T 2207/20024* (2013.01); *G06T 2207/20081* (2013.01); *G06T 2207/20084* (2013.01)

(56) References Cited

U.S. PATENT DOCUMENTS

| | | | |
|---|---|---|---|
| 2018/0253622 A1* | 9/2018 | Chen | G06V 10/82 |
| 2020/0167943 A1 | 5/2020 | Kim et al. | |
| 2021/0064913 A1* | 3/2021 | Ko | G06K 9/6272 |
| 2022/0148184 A1* | 5/2022 | Biswas | G06T 7/11 |

OTHER PUBLICATIONS

Lin et al., "Using Deep Learning and Gaussian Mixture Models for Road Scene Segmentation", International Journal of Engineering Science and Innovative Technology (IJESIT) vol. 6, Issue 6, Nov. 2017, pp. 27-36.

Zohourian et al., "Superpixel-based Road Segmentation for Real-time Systems Using CNN", In Proceedings of the 13th International Joint Conference on Computer Vision, Imaging and Computer Graphics Theory and Applications (VISIGRAPP 2018)—vol. 5: VISAPP, pp. 257-265.

Alam et al., "Nearest Neighbor Classifier for Vision Based Unstructured Road Detection", Nov. 2019, 5 pages.

* cited by examiner

420

TRAINING

430
OUTPUT

400

METHOD, APPARATUS, AND SYSTEM USING A MACHINE LEARNING MODEL TO SEGMENT PLANAR REGIONS

BACKGROUND

Modern location-based services and applications (e.g., autonomous driving) rely on having accurate and up-to-date digital map data. One approach to maintaining digital map data is to deploy vehicles to capture street images of map features (e.g., signs or other pole-like objects on near roadways) and then use the images to determine the real-world distances or depths of the map features with respect to a known real-world location of the digital map. The first step is to extract a ground plane, then to map a map feature to a point on the ground plane. Another application of the ground plane is to identify real-time free-space on a road for autonomous driving. However, accurately and timely extracting a ground plane using image segmentation can present significant technical challenges.

SOME EXAMPLE EMBODIMENTS

Therefore, there is a need for an approach for providing a lightweight, fast and accurate machine learning model for identifying planar region(s) in an image.

According to one embodiment, a computer-implemented method comprises determining a model for performing image segmentation to identify one or more planar regions of an image. The model comprises at least: a trainable filter that convolves the image to generate an input volume comprising a projection of the image at a plurality of different resolution scales; and one or more features to identify one or more image regions having a texture within a similarity threshold. The method also comprises processing the image using the model by generating the input volume from the image using the trainable filter and extracting the one or more features from the input volume to determine the one or more regions having the texture within the similarity threshold. The method further comprises determining the one or more planar regions of the image by clustering the one or more image regions. The method further comprises generating a planar mask based on the one or more planar regions. The method further comprises providing the planar mask as an output of the image segmentation.

According to another embodiment, an apparatus comprises at least one processor, and at least one memory including computer program code for one or more computer programs, the at least one memory and the computer program code configured to, with the at least one processor, cause, at least in part, the apparatus to determine a model for performing image segmentation to identify one or more planar regions of an image. The model comprises at least: a trainable filter that convolves the image to generate an input volume comprising a projection of the image at a plurality of different resolution scales; and one or more features to identify one or more image regions having a texture within a similarity threshold. The apparatus is also caused to process the image using the model by generating the input volume from the image using the trainable filter and extracting the one or more features from the input volume to determine the one or more regions having the texture within the similarity threshold. The apparatus is further caused to determine the one or more planar regions of the image by clustering the one or more image regions. The apparatus is further caused to generate a planar mask based on the one or more planar regions. The apparatus is further caused to provide the planar mask as an output of the image segmentation.

According to another embodiment, a non-transitory computer-readable storage medium carries one or more sequences of one or more instructions which, when executed by one or more processors, cause, at least in part, an apparatus to determine a model for performing image segmentation to identify one or more planar regions of an image. The model comprises at least: a trainable filter that convolves the image to generate an input volume comprising a projection of the image at a plurality of different resolution scales; and one or more features to identify one or more image regions having a texture within a similarity threshold. The apparatus is also caused to process the image using the model by generating the input volume from the image using the trainable filter and extracting the one or more features from the input volume to determine the one or more regions having the texture within the similarity threshold. The apparatus is further caused to determine the one or more planar regions of the image by clustering the one or more image regions. The apparatus is further caused to generate a planar mask based on the one or more planar regions. The apparatus is further caused to provide the planar mask as an output of the image segmentation.

According to another embodiment, an apparatus comprises means for determining a model for performing image segmentation to identify one or more planar regions of an image. The model comprises at least: a trainable filter that convolves the image to generate an input volume comprising a projection of the image at a plurality of different resolution scales; and one or more features to identify one or more image regions having a texture within a similarity threshold. The apparatus also comprises means for processing the image using the model by generating the input volume from the image using the trainable filter and extracting the one or more features from the input volume to determine the one or more regions having the texture within the similarity threshold. The apparatus further comprises means for determining the one or more planar regions of the image by clustering the one or more image regions. The apparatus further comprises means for generating a planar mask based on the one or more planar regions. The apparatus further comprises means for providing the planar mask as an output of the image segmentation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a machine learning model for identifying planar region(s) in an image are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to images, it is contemplated that the approach described herein may be used with other observations of a phenomenon, such as audio recordings, etc., which features can be extracted for identifying in other observations with similar features. As used herein, the term "feature" refers to an attribute or property shared by all of the independent units on which analysis or prediction is to be done. Any attribute could be a feature, as long as it is useful for the model to identify planar region(s) in an image. The terms "input volume", "input pyramid," "input pyramid volume," "pyramid tensor," and "input pyramid tensor volume" are used interchangeably.

Figure 1:
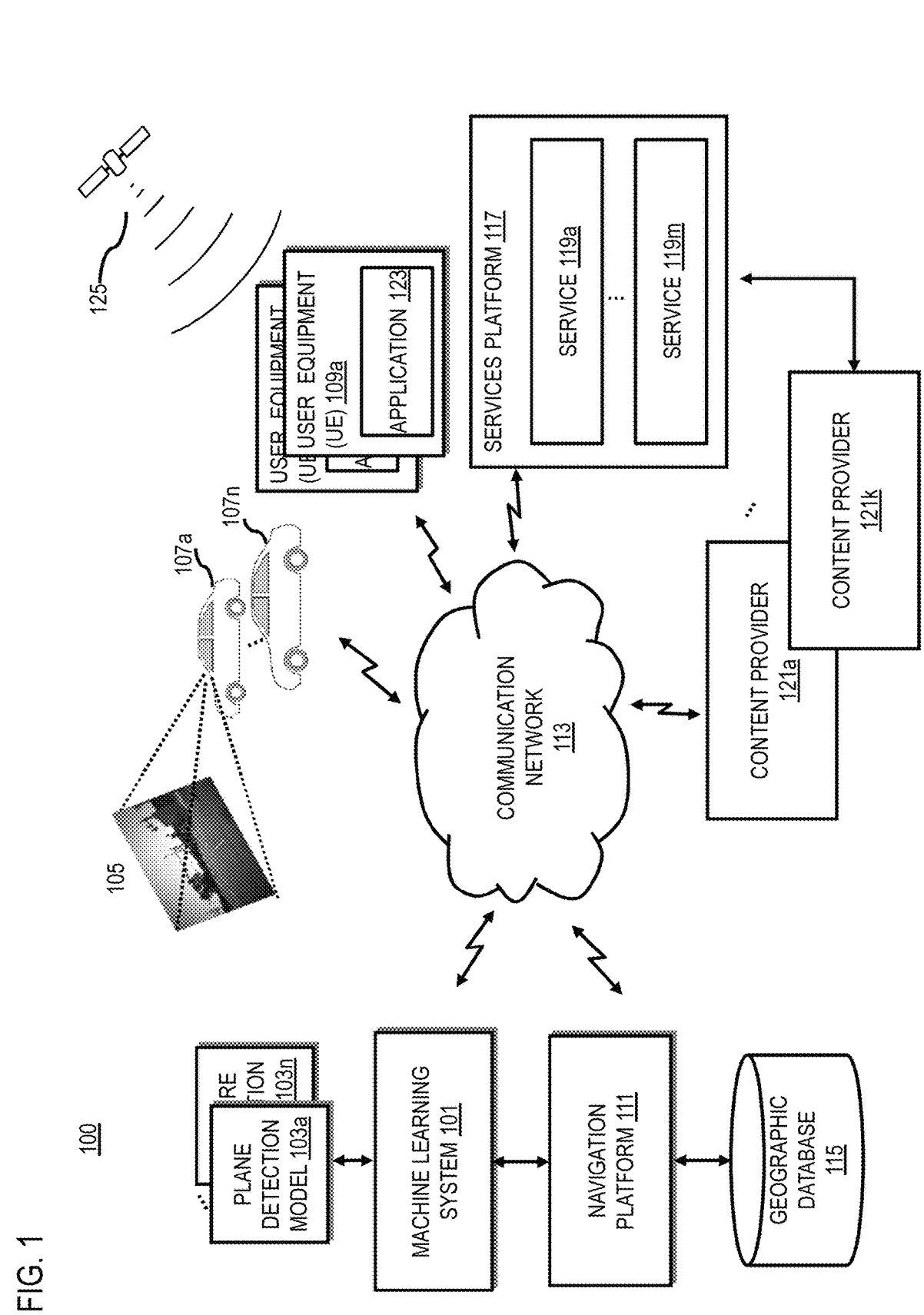
FIG. 1 is a diagram of a system capable of providing a machine learning model for identifying planar region(s) in an image, according to one embodiment.

FIG. 1 is a diagram of a system 100 capable of providing a machine learning model for identifying planar region(s) in an image, according to one embodiment. In one embodiment, a machine learning system (e.g., machine learning system 101) or model (e.g., feature detection models 103a-103n-also collectively referred to as feature detection models 103, including a plane detection model 103a) can be trained using ground truth or training data (e.g., annotated images) containing examples of objects or features to be classified by the machine learning model. The annotated images (e.g., ground truth or training data) include observations that have been annotated with labels that are known or accepted to be true by a human annotator. In a mapping or navigation use case, objects such as ground planes, buildings, vehicles, pedestrians, obstacles, and/or the like can be important to detect and recognize in imagery captured, for instance, by vehicles as they travel in a road network.

As mentioned, a traffic sign can be mapped to a point on a ground plane identified by image segmentation, which is then subsequently localized to a latitude-longitude position. Besides being used in determining real-world distances or depths of map features (e.g., the traffic sign) with respect to a known real-world location in a digital map, planar regions in images is identified and incorporated in a pre-processing stage of many pipelines, such as a sign positioning pipeline, an pedestrian recognition pipeline, etc. for supporting autonomous driving. For example, when a vehicle needs to identify free-space on a road where it can reach without collision. This scenario is essential for real-time path planning employed by self-driving vehicles.

However, image segmentation of partitioning an image into multiple segments (sets of pixels, also known as image objects) is computationally expensive, since a label is explicitly assigned to each pixel in the input image such that pixels with the same label can be grouped into image objects. Finding planar regions usually becomes a performance bottleneck in the image segmentation. Basically, a machine learning model can classify pixels and output a mask of planar regions showing the pixels of the planar regions as a plane surface (e.g., a ground surface). Therefore, there is a need for a lightweight, fast, and accurate model/algorithm to planar regions in an image.

To address these technical challenges, a system 100 of FIG. 1 introduces a fast and accurate machine learning model (e.g., the plane detection model 103a) that heavily incorporates domain knowledge optimized for segmenting planar regions and fuses computer vision with deep learning in to one unified model. Balancing between speed and accuracy, in one embodiment, the machine learning model has a size of 25 MB, and delivers a pixelwise Intersection-Over-Union (IOU) score of 85% at an inference speed of 15 frames per second on a laptop with a graphics processing unit (GPU) (e.g., NVIDIA® Quadro P1000 laptop with GPU). Other existing approaches focus mainly either on accuracy or performance.

Figure 2:
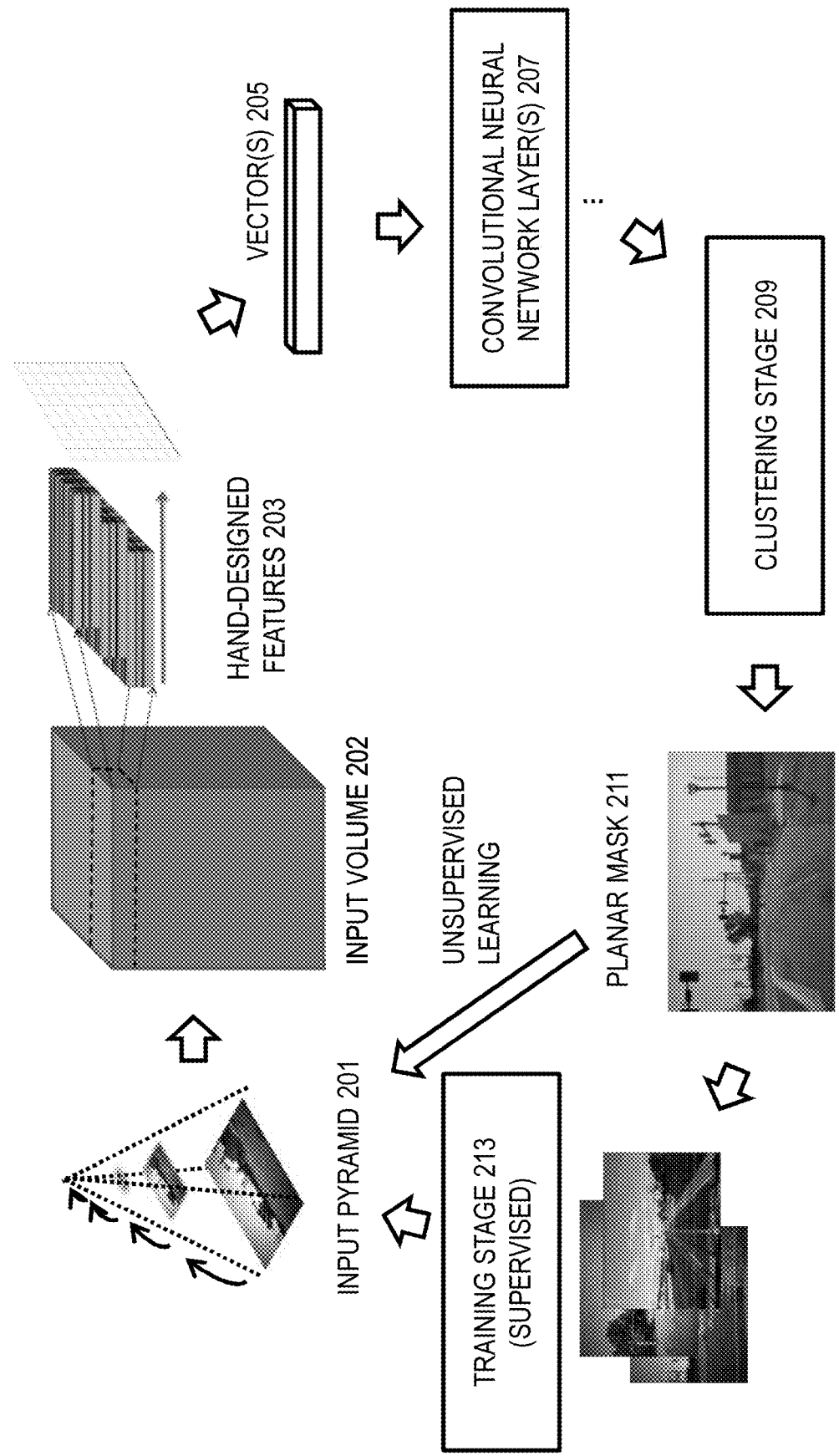
FIG. 2 is a diagram illustrating an example image segmentation architecture for identifying planar region(s) in an image using a machine learning model, according to one embodiment.

FIG. 2 is a diagram illustrating an example image segmentation architecture 200 for identifying planar region(s) in an image using a machine learning model, according to one embodiment. For example, an image 105 can be a street view image that depicts buildings, pedestrians, vehicles, etc. captured by on-board devices of one or more vehicles 107a-107n (collectively 107) and/or user terminals 109a-109m (collectively 109), while the vehicles 107 are communicating with a navigation platform 111 via a communication network 113 for navigation services. In one embodiment, the model 103a can pre-process the image 105 according to the architecture 200 into an input pyramid 201, and then an input volume 202 containing hand-deigned features 203.

The input volume 202 can be converted into one or more vectors 205 to pass via one or more convolutional neural network layers 207 to identify pixels in the image 105 belonging to certain object categories (e.g., a planar pixel). The planar pixels can be clustered via a clustering stage 209 into a planar mask 211.

In one embodiment, the model 103a can directly group the planar pixels into one or more planar regions as the planar mask 211. In another embodiment, the model 103a can apply additional processes to connecting clusters of planar pixels, since some image patches may be skipped during the pre-processing to increase processing speed. For example, the model 103a can deploy a seed fill algorithm to connect planar pixel clusters with common shapes (e.g., rectangular) or colors (e.g., in a limited range of colors), etc. into one or more planar regions as the planar mask 211.

In one embodiment, the planar mask 211 can be a translucent layer of highlighted planar pixels/regions to be overlaid on the image 105. In one embodiment, the planar mask 211 can be a contour line or bounding box around the planar regions to be overlaid on the image 105. As such, the plane detection model 103a can leverage the hand-designed features 203 in conjunction with the convolutional neural net layer(s) 207 to perform end-to-end inference from the input image 105 (can be of any dimensions) to generate the planar mask 211 of the same resolution as the input image 105.

Referring back to the input pyramid 201, in one embodiment, the input pyramid 203 is generated by convolving the input image 105 with a filter repeatedly, which is, in a loose sense, like a projection of the image 105 at different scales.

Figure 3:
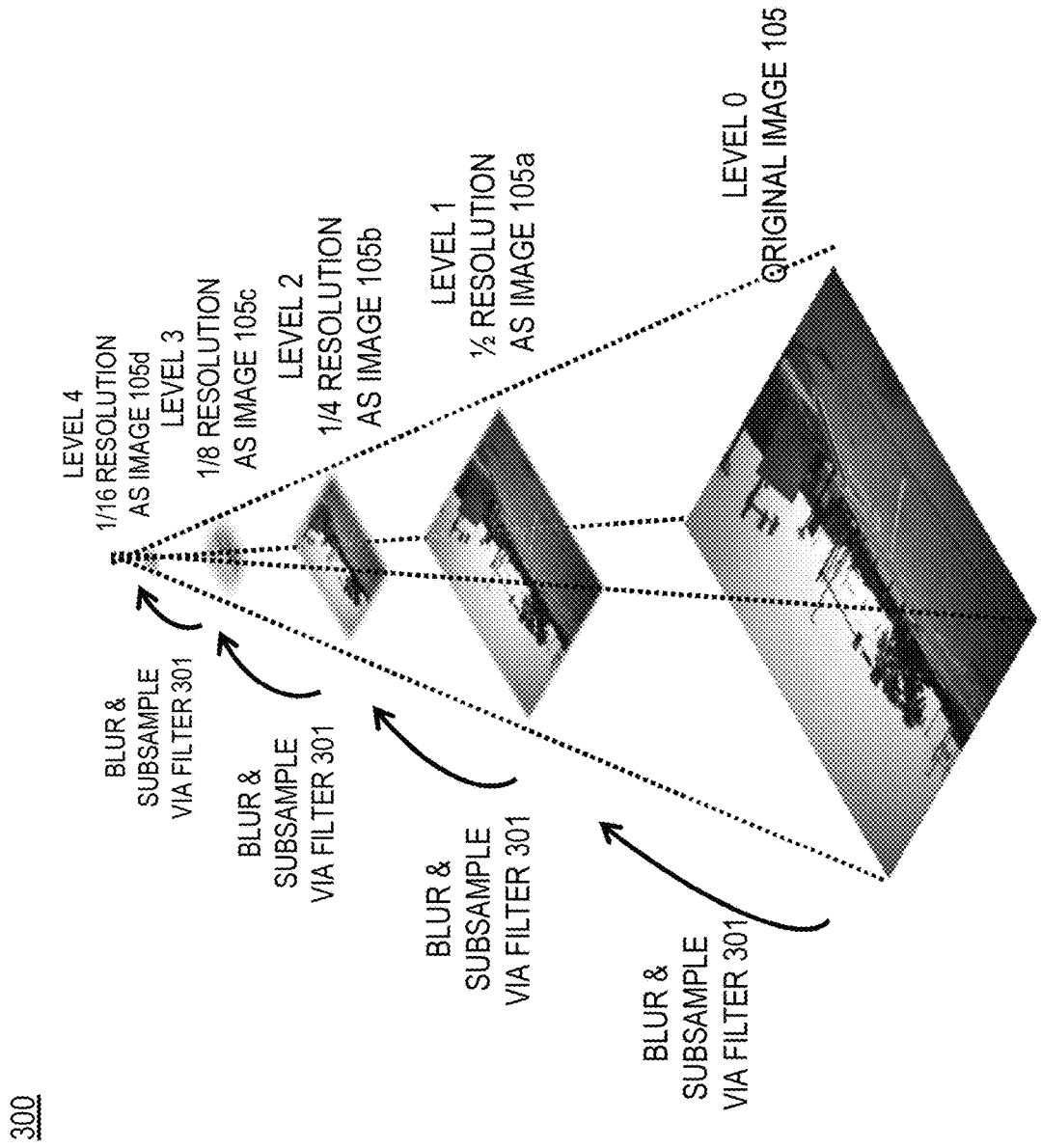
FIG. 3 is a diagram illustrating an example input pyramid, according to one embodiment.

In convolutional neural networks (CNNs), filters are not defined. The value of each filter can be learned in a supervised or unsupervised manner. Each filter can be randomly initialized according to some distribution (Normal, Gaussian, etc.). By having different initialization criteria, each filter is set up differently, and eventually learn to detect different features in an image automatically. Random initialization ensures that each filter learns to identify different features. FIG. 3 is a diagram illustrating an example input pyramid 300, according to one embodiment. For instance, a gaussian filter 301 is repeatedly applied to produce a "gaussian pyramid" 300.

At each scale, the image blurriness is increased via subsampling (e.g., gaussian filtering). For example, at level 0 (no filtering yet), the original image 105 has the original/spatial resolution. At level 1, the gaussian filter 301 reduces the resolution of the image 105 into half (½) to generate an image 105a with ½ of the original resolution. At level 2, the gaussian filter 301 further reduces the resolution of the image 105a into half (½) to generate an image 105b with ¼ of the original resolution. At level 3, the gaussian filter 301 further reduces the resolution of the image 105b into half (½) to generate an image 105c with ⅛ of the original resolution. At level 4, the gaussian filter 301 further reduces the resolution of the image 105c into half (½) to generate an image 105d with 1/16 of the original resolution. The blurrier an image is, the objects in the images of higher scales are more highlighted. In one embodiment, the higher-scale outputs (e.g., images 105a-105d) can be resized, such as using nearest-neighbor interpolation, to match with the original/spatial resolution of the original image 105. These resized outputs can then be concatenated channelwise to produce an volume from which hand-designed features 203 can be extracted.

In one embodiment, the initial gaussian filter 301 is unsupervised (i.e., not trained). In another embodiment, the initial gaussian filter 301 can be supervised/trained, such that gradients can flow through the gaussian filter 301 in a training stage 213 (to be explained in conjunction with FIG. 4). By way of example, gradient descent or variants such as stochastic gradient descent can be used. This training of the gaussian filter 301 is analogous to repeating a single depthwise convolutional filter across multiple subsequent convolutional neural network layers. This differentiates the application of the input pyramid 300 from typical usages of a gaussian pyramid.

Regarding the hand-deigned features 203, they can be image features designed to aid in finding planar regions in the image 105, having similar textures, and/or tolerant to dynamic environment lighting. The model 103a can compute these features 203 by leveraging argsorting techniques and constructing each image-patch into a vector mapping (e.g., a vector being an AutoSeg feature). These vectors can significantly simplify the task of plane finding, since they are specialized to identify image regions with similar textures. This will be explained in detail in conjunction with FIGS. 6-7.

During the clustering stage 209, with separate regions in the image 105 being reduced to the vectors (e.g., AutoSeg features), a collection of clustering and nearest neighbor matching algorithms (e.g., nearest-neighbor AutoSeg Freespace extraction) are applied to the vector(s) 205 to identify the plane mask 211 from a set of seed points. The details of automatically determining the seed points will be explained in conjunction with FIG. 8.

The architecture 200 described up to the planar mask 211 can learn in an unsupervised fashion without training (e.g., an unsupervised learning path to overlay the planar mask 211 on the original image as an output image). In another embodiment, the plane detection model 103a can be trained to better detect planar regions depicted in images in a training stage. A large number of labeled observations or imagery are used to train the plane detection model 103a to achieve target levels of detection accuracy. For instance, the plane detection model 103a can be improved/trained by adding a training stage 213 that deploys one or more deep learning powered, trainable convolutional layers, i.e., machine learning augmentation. By way of example, the training stage 213 can include an auxiliary convolutional network architecture which takes the input pyramid 201 and the hand-designed features 203 as inputs to further refine and generalize the ground plane mask predictions.

Figure 4:
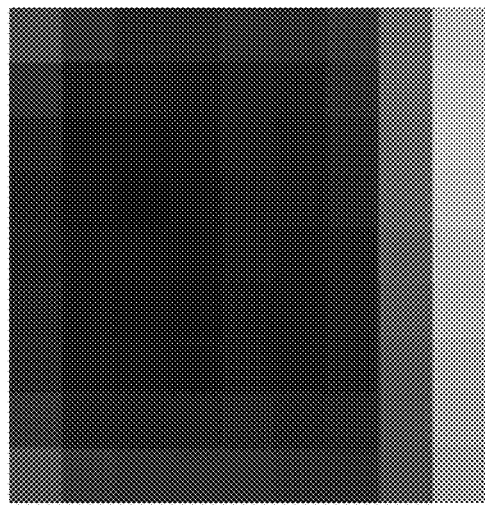
FIG. 4 are diagrams illustrating example filters and the corresponding output images, according to various embodiments.
Figure 4:
Figure 4:
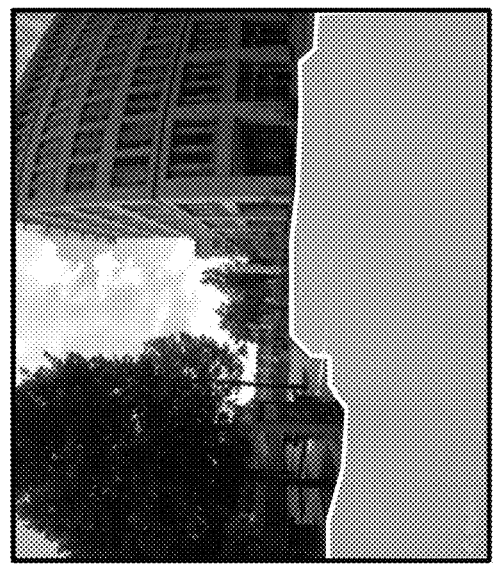
Figure 4:
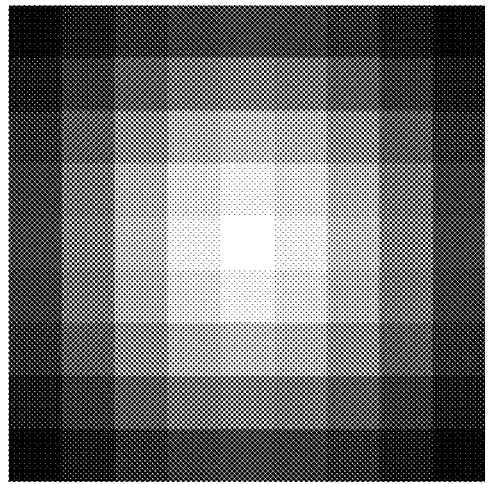

FIG. 4 are diagrams illustrating example filters and the corresponding output images, according to various embodiments. According to a supervised learning path of the architecture 200 (i.e., all stages except the training stage 213), the gaussian filter 301 used for generating the input pyramid 300 can be visualized into a 9×9×3 grayscale kernel 400 as shown on top left corner of FIG. 4. A white pixel in the kernel 400 means all 3 channels R, G, B are 255 (or 1.0).

The gaussian filter 301 can be trained during the training stage 213, such that a trained gaussian filter can be visualized into a 9×9×3 colored kernel 420 in FIG. 4. In this case, the filter values towards the lower end of the trained kernel 420 have higher intensities that indicate further adaption to detect planar regions typically located on the lower regions of an image. In this case, the corresponding output image 430 (i.e., an image overlaid with a planar mask) via the supervised path of the architecture 200 is shown below the kernel 420 in FIG. 4.

Beside the gaussian filter 301, the convolutional neural network layers 207, the clustering stage 209 can be trained concurrently or separately during the training stage 213. For instance, the convolutional neural network layers 207 ingesting outputs of an unsupervised module (e.g., the filter 301) can be separately trained using a custom loss function and/or a unique training strategy. In one embodiment, the training strategy can propagate gradients into the plane detection model 103a through two sources. One source can be the final output from the convolutional neural network layers 207 at the end and the other source can be the planar mask 211 from the unsupervised module (e.g., the filter 301). Gradients from these two sources are combined at the feature vector computation node and propagated backwards to train the pyramid filter 301 (e.g., a kernel).

In one embodiment, the machine learning system 101 may work in conjunction with the navigation platform 111 for transmitting and/or presenting digital maps, navigation instructions, etc. for the vehicles 107 and/or users (e.g., drivers, passengers, etc.) of the vehicles 107. In one embodiment, the plane detection model 103a performs pixel-based segmentation on the image 105 into various groups of planar pixels. The pixel-based segmentation of plane regions can be a standard operation of the machine learning system 101, the navigation platform 111, or a combination thereof.

After the training, the plane detection model 103a is applied to classify a body of images to identify planar regions. By way of example, the images can be collected from any source including but not limited to the vehicles 107 and/or the user terminals 109 traveling in a road network. In one embodiment, the images can be collected by the machine learning system 101 over the communication network 113 as a part of a digital map making pipeline to generate a geographic database 115 of the found features/ objects (e.g., location-based features such as, but not limited to, features/objects associated with roads, road furniture, points of interest, other vehicles, buildings, structures, terrain, etc.).

Therefore, the machine learning system 101 can segment/ extracting road/planar regions from an image, using hand-designed features along with convolutional neural network layers for performing end to end inference from the image to an output mask of a planar region. The input image is first convolved with a trainable gaussian filter repeatedly to produce a gaussian pyramid (i.e., a projection of the image at different scales) which is a single depthwise convolutional filter repeated across multiple subsequent CNN layers. The outputs of the filter can be resized using nearest neighbor interpolation and concatenated to produce a pyramid volume. Next, features are extracted from the pyramid volume by using argsorting to construct unique image-patch to vector mappings. Then, a collection of clustering and nearest neighbor matching algorithms are applied to the features for identifying a plane mask from a set of seed points. Optionally, a deep learning module (i.e. an auxiliary convolutional network) can be used that takes the gaussian pyramid and the features as inputs and refines and generalizes ground plane mask predictions.

In FIG. 1, the machine learning system 101 and the navigation platform 111 are separated. In another embodiment, the machine learning system 101 can be incorporated into the navigation platform 111.

Figure 5:
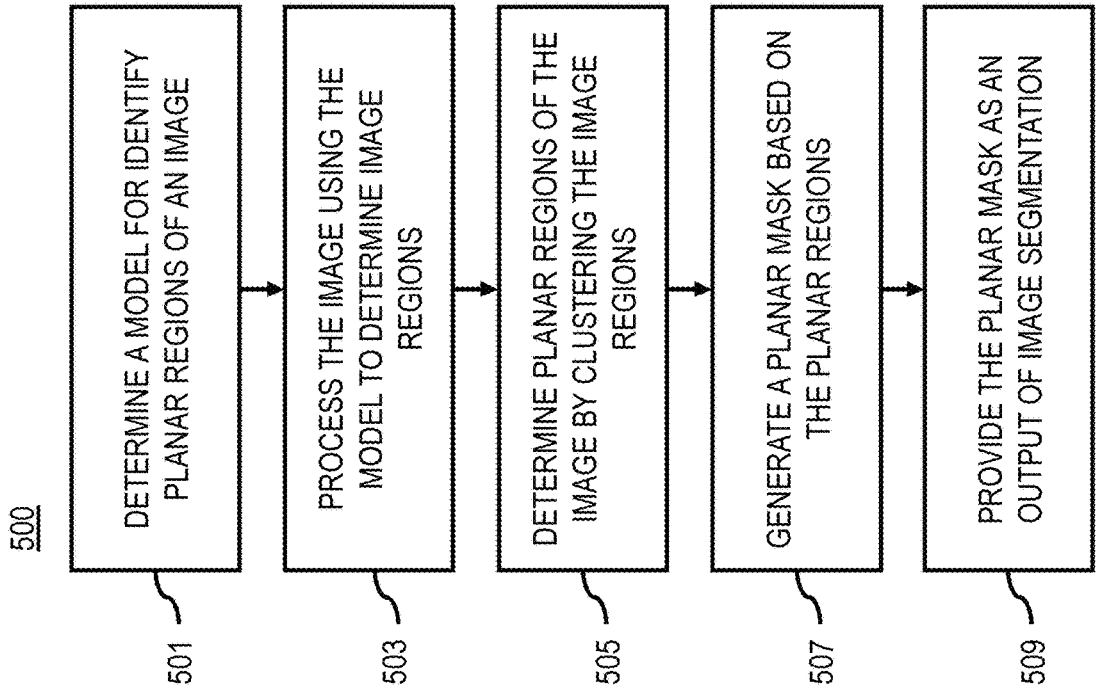
FIG. 5 is a flowchart of a process for provide a machine learning model for identifying planar region(s) in an image, according to one embodiment.
Figure 12:
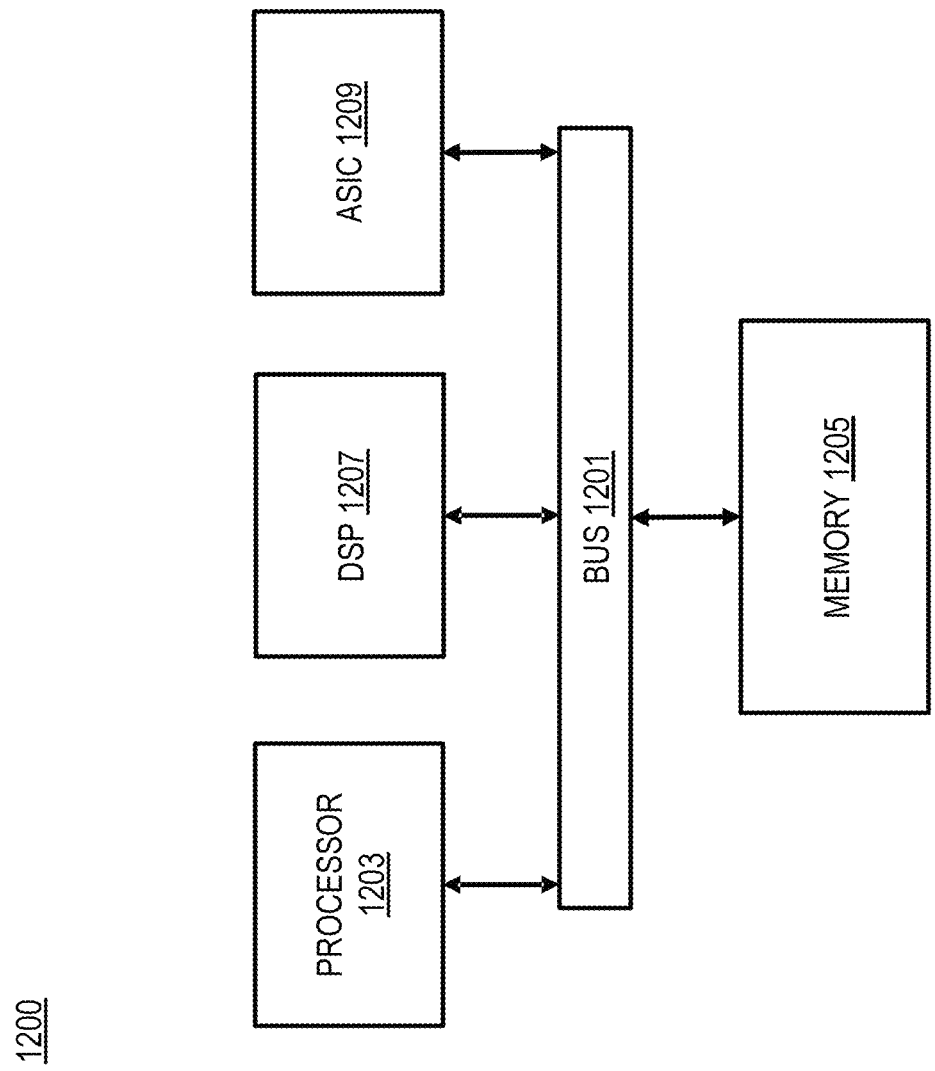
FIG. 12 is a diagram of a chip set that can be used to implement an embodiment of the invention.

FIG. 5 is a flowchart of a process 500 for provide a machine learning model for identifying planar region(s) in an image, according to one embodiment. In one embodiment, the machine learning system 101, the navigation platform 111, and/or the plane detection model 103a may perform one or more portions of the process 500 and may be implemented in, for instance, a chip set including a processor and a memory as shown in FIG. 12. As such, the machine learning system 101, the navigation platform 111, and/or the plane detection model 103a can provide means for accomplishing various parts of the process 500. In addition or alternatively, a services platform 117 and/or one or more services 119a-119m (also collectively referred to as services 119) may perform any combination of the steps of the process 500 in combination with the machine learning system 101, the navigation platform 111, and/or the plane detection model 103a, or as standalone components. Although the process 500 is illustrated and described as a sequence of steps, it is contemplated that various embodiments of the process 500 may be performed in any order or combination and need not include all of the illustrated steps.

In one embodiment, in step 501, the machine learning system 101 can determine a model (e.g., the plane detection model 103a) for performing image segmentation to identify one or more planar regions of an image (e.g., the image 105). The model comprises at least: (1) a trainable filter that convolves the image to generate an input volume (e.g., the input volume 202) comprising a projection of the image at a plurality of different resolution scales (e.g., into the input pyramid 201); and (2) one or more features (e.g., the hand-designed features 203) to identify one or more image regions having a texture within a similarity threshold. In one embodiment, a trainable filter means that gradient will be following through this filter in a training stage of the model. By way of example, the trainable filter can be a gaussian filter (e.g., the filter 301 in FIG. 3), and each scale of the plurality of different resolution scales (e.g., ½, ¼, ⅛, etc.) can differ with respect to a blurriness level (e.g., level 1, level 2, level 3, etc.).

Figure 6A:
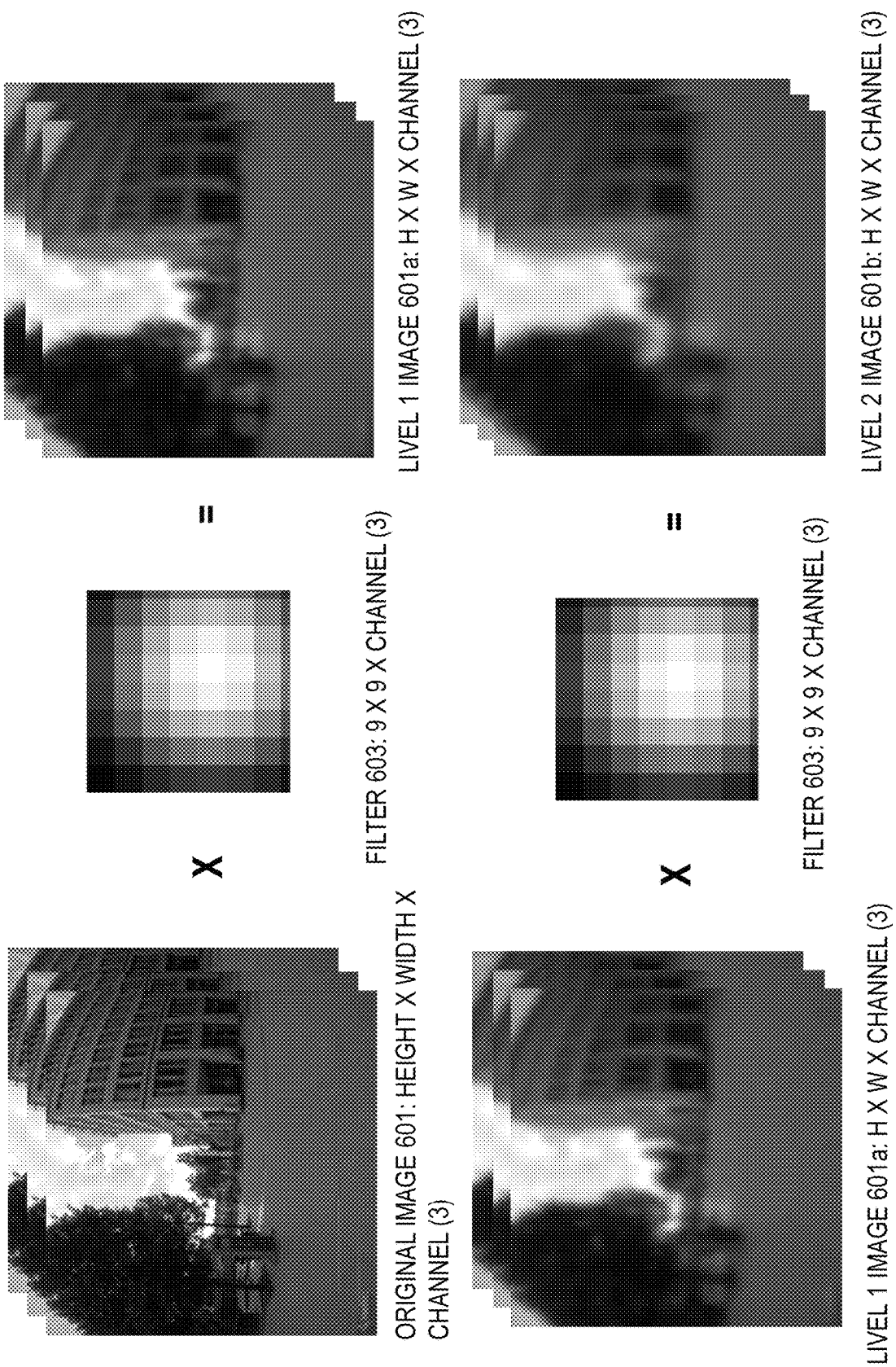
FIG. 6A is a diagram illustrating an example application of a filter across one image to generate an input volume, according to one embodiment.

In one embodiment, the trainable filter can be a single depthwise convolutional filter repeated across one or more neural network layers of the model. FIG. 6A is a diagram illustrating an example application of a filter across one image to generate an input volume, according to one embodiment. An original image 601 is used instead of the original image 105 for simplification. In this example, a 9×9×3 kernel 603 can be initialized for 3 channels R, G, B on the original image 601, to generate a Level 1 image 601a. The 9×9×3 kernel 603 can be initialized for three channels R, G, B again on the Level 1 image 601a, to generate a Level 2 image 601b. In this example, each channel is a 9×9 matrix, where each value is sampled from a two-dimensional gaussian distribution given by the following equation (additional gaussian constants have been discarded):

$$v'_{x,y} = e^{-\left(\frac{x^2+y^2}{2\sigma^2}\right)} \quad (1)$$

$v_{x,y}'$ is the unnormalized value of the kernel filter 603 (e.g., the kernel 400 in FIG. 4) at position x,y. Therefore, in this case, both x and y lie in the range [−4,+4]. Subsequently, each channel is divided by the sum of all the gaussian values. Each value $v_{x,y}'$ then becomes:

$$v_{X,Y} = \frac{v'_{x,y}}{\sum_{x=-4,y=-4}^{x=+4,y=+4} v'_{x,y}} \quad (2)$$

When visualized as grayscale pixels (ranging from 0 to 255), this filter 603 looks like the kernel 400 in FIG. 4, where σ=2.4. In this example, two scales have been extracted from the original image 601 into a Level 1 image 601a and a Level 2 image 601b to form a total of three outputs. For instance, the trainable filter 603 is convolved over the original image 601 to generate the Level 1 image 601a. The Level 1 image 601a is then convolved again with the trainable filter 603 to generate the Level 2 image 601b. Thereafter, the machine learning system 101 can obtain three outputs: the original image 601, the First Pass or Level 1 convolved image 601a, and the Second Pass or Level 2 convolved image 601b. In one embodiment, one or more outputs (e.g., Level 1 image 601a, Level 2 image 601b, etc.) of the trainable filter 603 are resized using a nearest-neighbor interpolation to match a spatial resolution of the image 601. These three outputs can be concatenated channelwise to form a "pyramid tensor" as discussed later.

In one embodiment, in step 503, the machine learning system 101 can process the image (e.g., the image 601) using the model (e.g., the plane detection model 103a) by generating the input volume (e.g., the input volume 202) from the image using the trainable filter (e.g., the filter 400 in FIG. 4) and extracting the one or more features (e.g., the hand-designed features 203) from the input volume to determine the one or more regions having the texture within the similarity threshold. For instance, the machine learning system 101 can perform a channelwise concatenation of the one or more outputs of the filter 400 to produce the input volume from which the one or more features (e.g., the AutoSeg Features) are extracted to determine the one or more image regions having a texture within a similarity threshold.

Figure 6B:
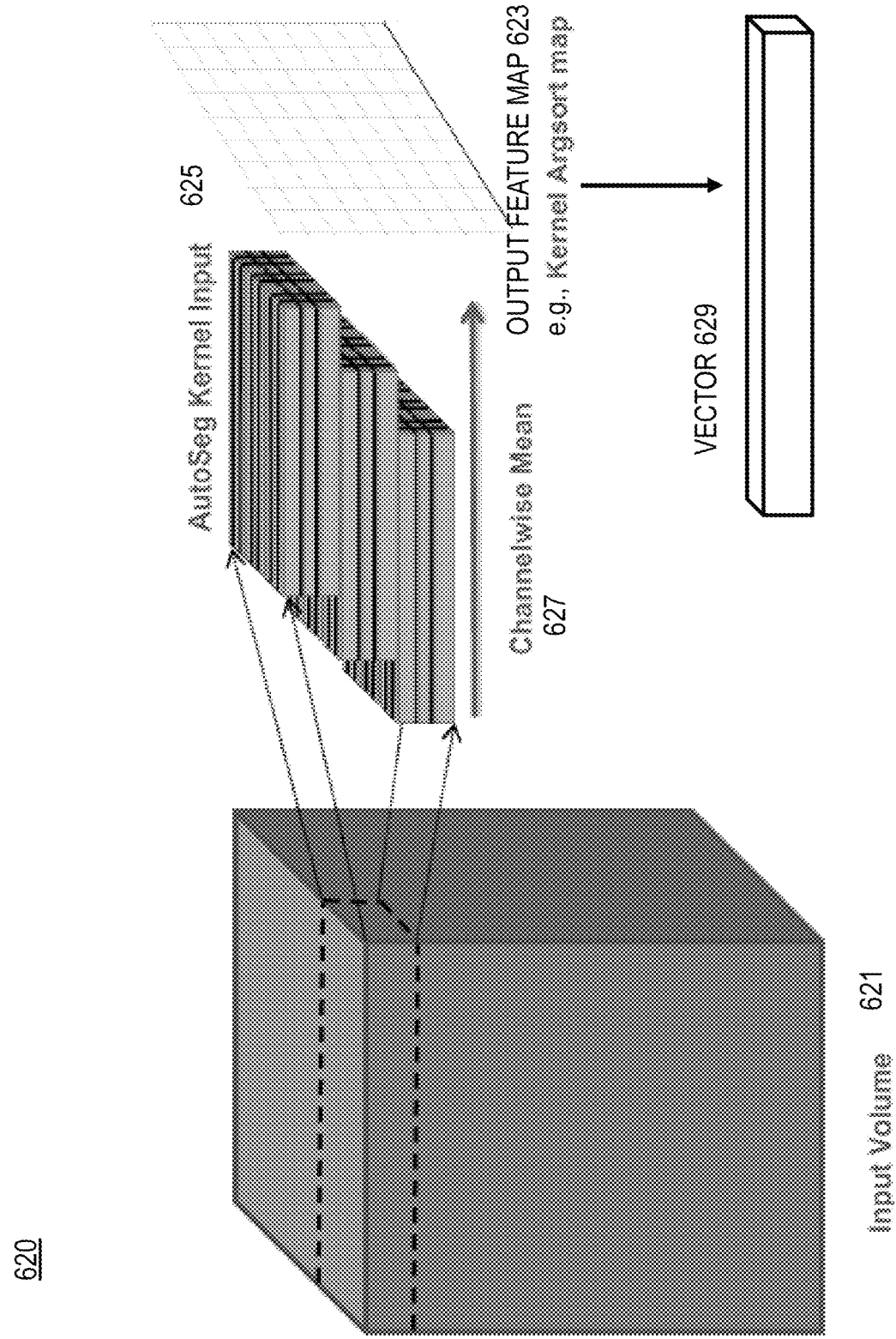
FIG. 6B is a diagram illustrating a processing of an input volume into a pyramid tensor, according to one embodiment.

FIG. 6B is a diagram illustrating a processing 620 of an input volume into a pyramid tensor, according to one embodiment. In this example, a hand-designed feature (e.g., an AutoSeg feature) can be computed over a patch of an input volume 621. In this scenario, the patch size is 9×9. This processing is analogous to an AutoSeg "kernel" sliding across the image to generate an output feature map 623 including the AutoSeg features. In one embodiment, the AutoSeg "kernel" is the trainable filter 603 in FIG. 6A. The steps of the processing 620 can be as follows.

First of all, for each patch mapped by the AutoSeg "kernel" (e.g., an AutoSeg kernel input 625) in the input volume 621, the machine learning system 101 can compute channelwise means 627 along the patch of the input volume 621. As such, the AutoSeg "kernel" can map the 9×9×C (C being the number of input channels, e.g., R, G, B) patch in the input volume 621 beneath it to a 9×9 output feature map 623 including the AutoSeg features (e.g., a kernel Argsort map). The stride can be selected randomly, selected according to a heuristic, or a combination thereof. By way of example, the AutoSeg "kernel" is slid across the input volume 621 with a stride of more than one (e.g., 10) to downsize the input volume 621 and accelerate the processing 620. The step size as a filter slides across an input volume (e.g., an image) is called a stride. When the stride is 1, the size of the input volume will stay the same. When a stride size greater than 1 will downsize the input volume. In this example, the size of a 9×9 output feature map 623 is smaller than that of the 9×9×C patch in the input volume 621.

In one embodiment, the machine learning system 101 can construct an image-patch to vector mapping of the image (e.g., the original image 601) based on the one or more features (e.g., the AutoSeg Features). The one or more image regions can be identified based on the image-patch to vector mapping.

Figure 7:
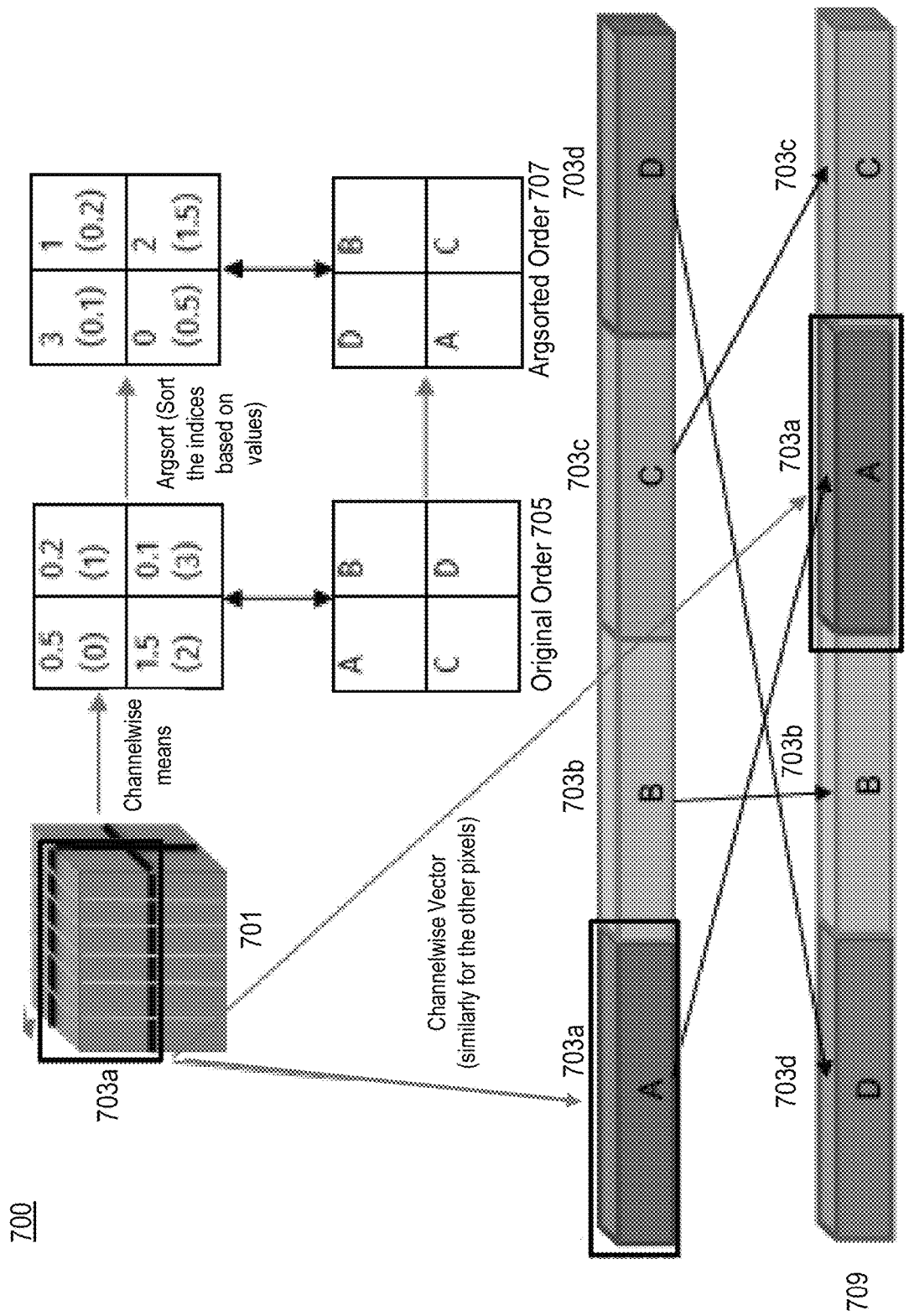
FIG. 7 is a diagram illustrating a processing of a sample input volume into a vector 707, according to one embodiment.

In the second step of the processing 620, the values of the output feature map 623 can be used to argsort (across the spatial dimensions) the region of the pyramid tensor volume 621 under the AutoSeg kernel into a vector 629. For simplification, an illustration of the second step using a 2×2×6 input volume is demonstrated as follows. FIG. 7 is a diagram illustrating a processing of a sample input volume 701 into a vector 707, according to one embodiment. For instance, a 2×2×6 volume 701 has 4 sets of pixels 703a-703d (e.g., with dimensions 1×1×6) along all the channels of the input volume 701 at a given spatial position (0, 0), (0, 1), (1, 0) and (1, 1) respectively. The original order 705 of the 4 sets of the pixels 703 is denoted as A, B, C, and D. For instance, the machine learning system 101 can calculate channelwise means for each set of the pixels 703a-703d as 0.5, 0.2, 1.5, and 0.1. By sorting (e.g., Argsort) the channelwise means in ascending order into 0.1, 0.2, 0.5, and 1.5, the original order 705 is then re-arranged to yield a new order 707 denoted as D, B, A, and C, thereby mapping the input volume 701 to a channelwise vector 709 of the 4 sets of the pixels in the new order 707. Each cuboidal module shown in FIG. 7 with a dimension of 1×1×6 for simplification. By analogy, the machine learning system 101 can apply the same processing to the input volume 621 in FIG. 6B to generate the vector 629.

As the third step of the processing 620, the vector 629 can be subject to Z-score normalization (e.g., element-wise subtraction of total vector mean and division by standard deviation). For instance, $X^{(X=[x_0, x_1, \ldots x_{n-1}])}$ is the obtained vector after the argsort step, it can be subject to the following operation:

$$\overline{x_k} = \frac{x_k - \mu}{\sigma}$$

Where $$\mu = \frac{1}{n}\sum_{i=0}^{i=n-1} x_i, \sigma = \frac{1}{n}\sum_{i=0}^{i=n-1} x_i - \mu \quad (3)$$

$x_k$ is the $k_{th}$ element of the output AutoSeg feature.

As the last step of the processing 620, the machine learning system 101 can convolve with the input volume 621 to obtain the AutoSeg Features of the input pyramid tensor volume.

Figure 8:
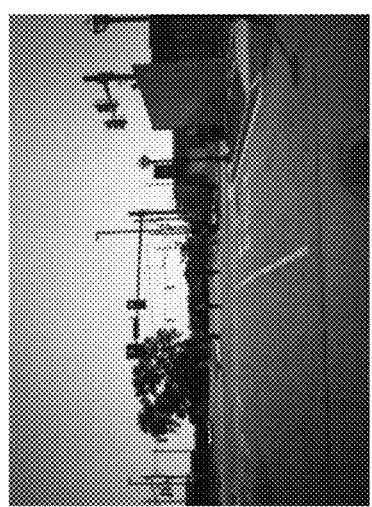
FIG. 8 is a diagram illustrating an example application of hand-designed features of a machine learning model for identifying planar region(s), according to one embodiment.
Figure 8:
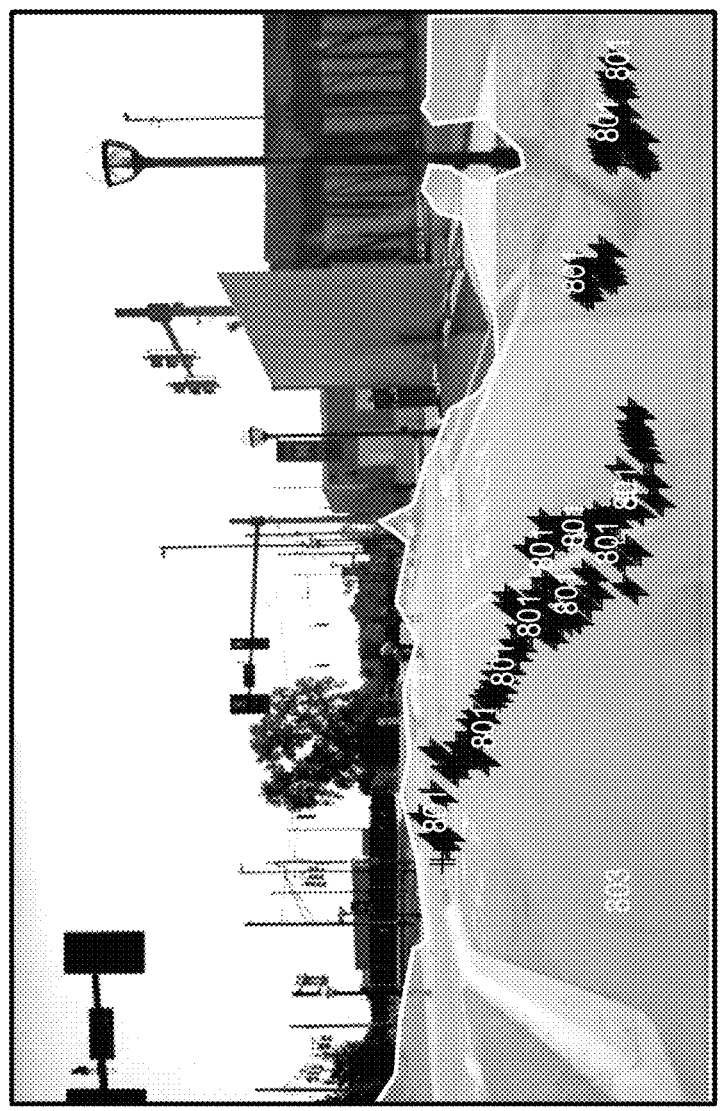

In one embodiment, in step 505, the machine learning system 101 can determine the one or more planar regions of the image by clustering the one or more image regions. In one embodiment, the one or more planar regions of the image are determined further based on a nearest neighbor matching. By way of example, the machine learning system 101 can deploy a processing 800 of nearest-neighbor planar region extraction (e.g., a nearest-neighbor AutoSeg freespace extraction), to use the AutoSeg features to identify visually similar regions in an image with similar texture(s). FIG. 8 is a diagram illustrating an example application of hand-designed features (e.g., the AutoSeg features) of a machine learning model for identifying planar region(s), according to one embodiment.

In one embodiment of the process 500 in FIG. 5, in step 507, the machine learning system 101 can generate a planar mask based on the one or more planar regions. For instance, the machine learning system 101 can compute the planar mask 803 as follows. By way of example, the machine learning system 101 can identify seed points 801 in the image 105, and use the seed points 801 as the basis to identify a ground plane 803 in the image 105. In the case, the machine learning system 101 can identify points in the image 105 out of the majority of which lie on the ground plane 803 using a nearest-neighbor planar region extraction algorithm performs as follows.

Let $P_{x,y}=[p_0^{x,y}, p_1^{x,y}, \ldots, p_{c-1}^{x,y}]$ be the channelwise vector 629 in the pyramid tensor 621 at position x,y, where the image height is h, the image width is w, and a reference vector R is defined as $R=[r_0, r_1, \ldots, r_{c-1}]$. Let n=w×h and a distance matrix D be defined as a two-dimensional matrix having a width w and a height h/2, and each element of the matrix D is denoted as $d_{x,y}$. The machine learning system 101 can apply nearest-neighbor planar region extraction algorithm as follows:

Step 1. Slice out the lower half (pixels having y≥h/2) of the pyramid tensor 621.

Step 2. Compute a spatial means of this pyramid slice for each channel R, G, or B to obtain a reference vector R.

$$\therefore r_i = \frac{2}{n}\sum_{y=h/2}^{y=h-1}\sum_{x=0}^{x=w-1} p_i^{x,y} \quad (4)$$

Where $r_i$ is the $i_{th}$ element of R.

Step 3. For each channelwise vector ri, compute the Euclidean distance from the reference vector R by computing the Frobenius norm (i.e., is matrix norm of an matrix defined as the square root of the sum of the absolute squares of its elements) of elementwise-differences between the pyramid channelwise vectors Px,y and the reference vector R.

$$d_{x,y} = \sqrt{\sum_{i=0}^{i=c-1}\left(p_i^{x,y+h/2} - r_i\right)^2} \ \forall \ x \in [0, w), y \in \left[0, \frac{h}{2}\right) \quad (5)$$

Where $d_{x,y}$ is the value of an element in the matrix D at position x,y.

Step 4. Extract the x,y coordinates of the minimum k values in matrix D, with k=n/64. Let the set of the extracted coordinates be P.

Step 5. Return the top ⅓rd elements (by corresponding values in matrix D) from P (x,y coordinates) as the seed points 801 in FIG. 8. The markers in FIG. 8 denote the seed points 801 from which the planar mask 803 is extracted.

After applying nearest-neighbor planar region extraction algorithm to determine the seed points 801, the machine learning system 101 can compute the planar mask 803 as follows.

1. Based on the seed point x,y coordinates, add a scalar of h/2 to all the y coordinates (since the lower half was taken from the pyramid volume 621 as explained in step 1 of the nearest-neighbor planar region extraction algorithm application process) to offset the estimates.

2. Retrieve the AutoSeg features corresponding to these seed points (let this set be a two-dimensional matrix A with a width c and a height n/192; n/192=⅓×n/64; from steps 4 and 5 of the nearest-neighbor planar region extraction algorithm application process; each element is $$a_{x,y} \forall \ x \in [0, c), y \in \left[0, \frac{n}{192}\right))$$

and a comparison vector $Q=[q_0, q_1, \ldots, q_{c-1}]$ having c elements; c being the number of channels in the pyramid tensor 621) is derived from i. This is done by computing the means along the height axis for each column in matrix A.

$$q_i = \frac{192}{n}\sum_{y=0}^{y=\frac{n}{192}-1} a_{i,y} \quad (6)$$

Where $q_i$ is the $i^{th}$ element in a reference vector Q.

3. Label all the planar pixels. Given that there is a set of all the AutoSeg features A' (two-dimensional matrix with width c, and height n; each element is $a_{xy} \forall x \in [0,c), y \in [0,n/192)$), a heatmap H is computed in a similar fashion as elicited in step 3 of the nearest-neighbor planar region extraction algorithm application process. Using Q as a reference vector, the machine learning system 101 can compute the heatmap H (having each element as $h_{x,y} \forall x \in [0,w), y \in [0,h)$) as follows:

$$h_{x,y} = \sqrt{\sum_{i=0}^{i=c-1} (a_i^{x+wy} - q_i)^2} \; \forall \, x \in [0, w), y \in [0, h) \quad (7)$$

4. Obtain the planar mask 803 from the heatmap H by thresholding the heatmap H at t where given $$\mu = \frac{1}{n} \sum_{y=0}^{y=h-1} \sum_{x=0}^{x=w-1} h_{x,y} \quad (8)$$

$$\sigma = \frac{1}{n} \sum_{y=0}^{y=h-1} \sum_{x=0}^{x=w-1} h_{x,y} - \mu \quad (9)$$

Those pixel coordinates where $h_{x,y} \leq t$ are then highlighted as planar pixels in the planar mask 803.

In one embodiment, in step 509, the machine learning system 101 can provide the planar mask (e.g., the planar mask 803) as an output of the image segmentation. In one embodiment, the navigation platform 111 can overlay the planar mask on the original image to provides the output image 800 and enable a range of new services and functions including autonomous driving. For example, with respect to autonomous driving, computer vision and computing power supporting object/feature detection and other related machine learning techniques have enabled real-time mapping and sensing of a vehicle's environment.

Figure 9:
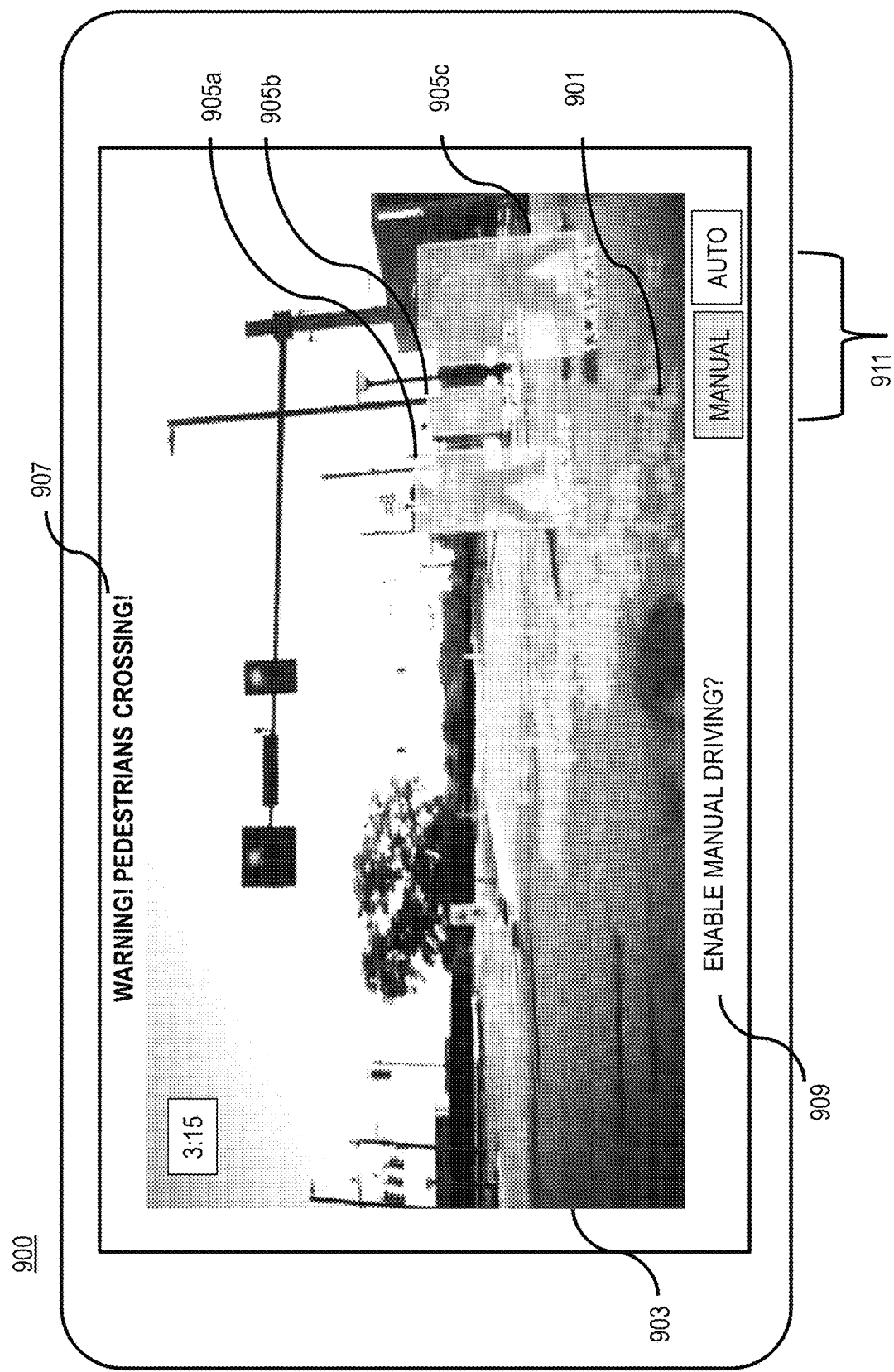
FIG. 9 is a diagram of an example user interface identifying at least planar region(s) in an image, according to one embodiment.

FIG. 9 is a diagram of an example user interface 900 identifying at least planar region(s) in an image, according to one embodiment. By way of example, the machine learning system 101 can process the image 105 of FIG. 1 via the image segmentation architecture of FIG. 2. Such pixel-based segmentation can identify one or more planar regions, one or more pedestrians, etc. of an image. By way of example, such pixel-based segmentation techniques, e.g., powered by convolutional neural networks (CNNs), can mark seed points 901 in red, overlay a planar mask 903 in purple, and draw bounding boxes 905a-905c of pedestrians, etc. Based on the outputs form the machine learning system 101, the navigation system 111 can determine the positions of the pedestrians on a road surface and generate an alert 907: "Warning! Pedestrians crossing!" In addition, the navigation system 111 can prompt a user to switch from autonomous driving to manually driving to avoid collusion with the pedestrians, e.g., by presenting a recommendation 909: "enable MANUAL Driving?" In response, the user can select one of the buttons 911: "Manual", or "Auto."

In one embodiment, the model (e.g., the plane detection model 103a) is an unsupervised model that learns on unlabeled data by extracting features and patterns on its own. By way of example, the flow described so far can learn in an unsupervised fashion needing no training, and can work out-of-box for plane detection. Due to this unsupervised learning nature, the model's generalization power is limited. In another embodiment, the machine learning system 101 can enhance the model 103a by adding some convolutional layers, i.e., machine learning augmentation. In other words, the model can be a supervised model that learns and evaluates its accuracy on ground truth data (e.g., a labeled dataset). For instance, the model is a trained machined learning model trained through at least one source. By way of example, the at least one source includes a first source and a second source, wherein the first source is a final output from one or more convolutional layers of the model, and wherein the second source is the planar mask. In one embodiment, the filter is an unsupervised module that provides one or more ingesting outputs to a supervised module of the model. Neural networks can be trained using stochastic gradient descent and require choosing a loss function to calculate the model error, when designing and configuring the model. There are many loss functions (e.g., cross-entropy, mean squared error, etc.) to choose from or to adapt for use. For instance, the machine learning model system 101 can provide a custom loss function for the one or more ingesting outputs to train the supervised module.

In this processing, the pyramid tensor is fed through a separable convolution layer with a kernel size of 2×2 to output f feature maps, where $f = n_{pyramid\_scales} \times 3$ gated by a rectified linear unit (ReLU) activation for modulating outputs. This is concatenated channelwise with the computed AutoSeg features as described previously to be fed into a series of three convolutional layers of a kernel size 3×3 each. The first two layers have 32 and 64 filters (number of output channels), and the last layer outputs one channel which is the planar mask 211.

As mentioned, the plane detection model 103a are trainable end-to-end since all components of the architecture of FIG. 2 are differentiable.

In one embodiment, the machine learning model system 101 can optimize the loss function to train the model as follows. Let Y be a ground truth mask and $y_{x,y}$ denote a pixel in it at position x,y. Similarly, let $\hat{Y}$ be the predicted mask with $\vec{y}_{x,y}$ denoting a pixel in the predicted mask at position x,y. Let x+ and y+ be the x and y coordinates of all points in Y where $y_{x,y}=1$, and x− and y− be the x and y coordinates of all points in Y where $y_{x,y}=0$. Let the first set be called P+ and the second set b P−. Let n+ and n− be the number of elements in P+ and P− respectively.

$$\therefore P^+ = [(x_0^+, y_0^+), (x_0^+, y_0^+), \ldots, (x_{n^+-1}^+, y_{n^+-1}^+)] \quad (10)$$

$$P^- = [(x_0^-, y_0^-), (x_0^-, y_0^-), \ldots, (x_{n^--1}^-, y_{n^--1}^-)] \quad (11)$$

Let $\hat{Y}+$ be the set of pixels in $\hat{Y}$ such that $\hat{y}_{x+,y+} \in \hat{Y}+$; basically, it contains the corresponding pixel values at the locations specified in P+.

Let $\hat{Y}-$ be the set of pixels in $\hat{Y}$ such that $\hat{y}_{x-,y-} \in \hat{Y}-$; basically, it contains the corresponding pixel values at the locations specified in P−.

Let the notations defined for $\hat{Y}$ be extended to $\hat{Y}_{ML}$ denoting the outputs of the entire model including the unsupervised module(s) and machine learning powered module(s) and $\hat{Y}_{noML}$ denoting the outputs from the unsupervised module(s) only. Do note that both of them have identical dimensions.

Let $n_b+$ and $n_b-$ be the number of elements in P+ and P− chosen for back-propagation, respectively. Backpropagation is a used in training feedforward neural networks for supervised learning. In fitting a neural network, backpropagation computes the gradient of the loss function with respect to the weights of the network for a single input-output example. As such, the machine learning system 101 can use gradient methods for training multilayer networks, updating weights to minimize loss, etc.

In this case, the machine learning system 101 can set $n_b+=n+$ and $n_b-=\min(2n+, n-)$. For choosing P−, the machine learning system 101 can select those outputs from AutoSeg whose values are in the top $n_b-$ out of n− total negative outs. As such, the machine learning system 101 can penalize the outputs which are most likely to predict a false positive when they output a high value.

First, the machine learning system 101 can define the dice losses from the outputs of the unsupervised module(s) and the MIL powered module(s):

$$L_{noML}^{dice} = 1 - \left( \frac{1 + 2\sum_{k^+}\sum_{y^+} \hat{y}_{x^+,y^+}^{noML}}{1 + \sum_{k}\sum_{y} \left( \hat{y}_{x,y}^{noML} + y_{x,y} \right)} \right) \quad (12)$$

$$L_{ML}^{dice} = 1 - \left( \frac{1 + 2\sum_{k^+}\sum_{y^+} \hat{y}_{x^+,y^+}^{ML}}{1 + \sum_{k}\sum_{y} \left( \hat{y}_{x,y}^{ML} + y_{x,y} \right)} \right) \quad (13)$$

$$L_{NN} = \frac{1}{n_b^+}\sum_{k^+}\sum_{y^+} \left(1 - \left(\hat{y}_{x^+,y^+}^{ML} + \hat{y}_{x^+,y^+}^{noML}\right)\right)^2 + \quad (14)$$

$$\frac{1}{n_b^-}\sum_{k^-}\sum_{y^-} \left(\hat{y}_{x^-,y^-}^{ML} + \hat{y}_{x^-,y^-}^{noML}\right)^2$$

Combining these equations, the machine learning system 101 can arrive at the final loss function defined as L.

$$L = L_{NN} + \beta(L_{ML}^{dice} + L_{noML}^{dice}) + \gamma\|W\|^2 \quad (15)$$

Where the machine learning system 101 can set $\beta = 1 \times 10^{-6}$ and $\gamma\|W\|2$ is the L2 loss weight decay with weight decay factor $\gamma = 1 \times 10^{-3}$ In the expanded form, the final loss function is translated into the following:

$$L = \frac{1}{n_b^+}\sum_{k^+}\sum_{y^+} \left(1 - \left(\hat{y}_{x^+,y^+}^{ML} + \hat{y}_{x^+,y^+}^{noML}\right)\right)^2 + \quad (16)$$

$$\frac{1}{n_b^-}\sum_{k^-}\sum_{y^-} \left(\hat{y}_{x^-,y^-}^{ML} + \hat{y}_{x^-,y^-}^{noML}\right)^2 +$$

$$\beta\left(2 - \left( \frac{1 + 2\sum_{k^+}\sum_{y^+} \hat{y}_{x^+,y^+}^{ML}}{1 + \sum_{k}\sum_{y} \left( \hat{y}_{x,y}^{ML} + y_{x,y} \right)} \right) - \right.$$

$$\left. \left( \frac{1 + 2\sum_{k^+}\sum_{y^+} \hat{y}_{x^+,y^+}^{noML}}{1 + \sum_{k}\sum_{y} \left( \hat{y}_{x,y}^{noML} + y_{x,y} \right)} \right) \right) + \gamma\|W\|^2$$

With variables as defined above, the machine learning system 101 can use the Adam optimization algorithm (i.e., is an extension to stochastic gradient descent) to optimize the loss function defined above. This loss function combines the outputs of the ML and noML modules.

As described earlier, the gradient computation for all trainable parameters (including the gaussian filter used in the beginning layer to construct the pyramid tensor) with respect to L can be performed and used to update the trainable parameters.

In one embodiment, the machine learning system 101 can use the output image 800 and/or other annotated/labelled images to train the plane detection model 103*a*. Beside planar regions, the image segmentation architecture of FIG. 2 can be adapted to detect other road features (e.g., signs, landmarks, buildings, etc.) and related identifying characteristics (e.g., traffic signs, corporate logos, etc. displayed on the signs, buildings, etc.), thereby more specifically identifying relevant map features. The localization of road features/objects within the image can be used as training data for respective feature/object prediction models 103 of the machine learning system 101.

Although various embodiments are described with respect to real-world images, it is contemplated that the approach described herein may be used with synthetic images. Synthetic refers to the image having the feature or object artificially place or inserted into an image that originally does not depict the feature or object.

In addition to images and data points of image pixels, the above-discussed embodiments can be applied to data records or files representing or recording observations of a phenomenon that can be labeled with features or characteristics identified by a machine learning model. The observation instance can be any data array, and the points include data points of the data array. The machine learning system 101 can process other observations of a phenomenon, such as audio recordings, etc., to provide hand-designed features to identify characteristics of interest, as the approach of identifying one or more planar regions of an image.

By way of example, the observation instance is a live concert recording (e.g., a speech sound sample, a song recording, a speech, etc.), and the machine learning system 101 can process the recording and identify one or more audience applause sessions, and remove these sessions form the live concert recording.

The above-discussed embodiments balance between speed and accuracy to provide a lightweight, fast, and accurate machine learning model for identifying planar region(s) in an image. The above-discussed embodiments use hand-designed features along with convolutional neural network layers for performing end to end inference from an input image to an output mask of a planar region.

The unique image segmentation architecture combines computer vision and with modern machine learning techniques can support, for example, an accuracy of 85% intersection over union and a speed of 15 frames/second on an NVIDIA® Quadro P1000 laptop with GPU or a Jetson AGX Xavier Developer Kit by NVIDIA®.

The above-discussed embodiments use a deep learning module that takes a gaussian pyramid and hand-designed features as input and refines and generalizes ground plane mask predictions.

The above-discussed embodiments apply a custom designed loss function to train the machine learning model with a light computation load to run on any general laptop with a GPU.

The above-discussed embodiments can be deployed at real-time as an inference engine on the edge, embedded in a platform/user device (e.g., a mobile phone). or in the cloud as an inference service.

Returning to FIG. 1, as shown, the system 100 includes the machine learning system 101 for providing high-quality training data set to train a machine learning model according the various embodiments described herein. In some use cases, the system 100 can include the plane detection model 103*a* configured to use machine learning to detect objects or features depicted in images. For example, with respect to autonomous, navigation, mapping, and/or other similar applications, the plane detection model 103*a* can detect road features (e.g., lane lines, signs, etc.) in an input image and generate training data, according to the various embodiments described herein. In one embodiment, the machine learning system 101 includes a neural network or other equivalent machine learning model (e.g., Support Vector Machines, Random Forest, etc.) to detect features or objects. In one embodiment, the neural network of the machine learning system 101 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 101, the navigation platform 111, and/or the plane detection model 103a also have connectivity or access to a geographic database 115 which stores representations of mapped geographic features to compare against or to store features or objects detected according to the embodiments described herein. The geographic database 115 can also store representations of detected features and/or related data generated or used to generate training data for a machine learning model.

In one embodiment, the machine learning system 101, the navigation platform 111, and/or the plane detection model 103a have connectivity over a communication network 113 to the services platform 117 that provides one or more services 119. By way of example, the services 119 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 119 uses the output of the machine learning system 101 and/or of the plane detection model 103a (e.g., detected lane features) to localize a vehicle 107 or a user terminal 109 (e.g., a portable navigation device, smartphone, portable computer, tablet, etc.) to provide services 119 such as navigation, mapping, other location-based services, etc.

In one embodiment, the machine learning system 101, the navigation platform 111, and/or the plane detection model 103a may be a platform with multiple interconnected components. The machine learning system 101, the navigation platform 111, and/or the plane detection model 103a may include multiple servers, intelligent networking devices, computing devices, components, and corresponding software for providing parametric representations of lane lines. In addition, it is noted that the machine learning system 101, the navigation platform 111, and/or the plane detection model 103a may be a separate entity of the system 100, a part of the one or more services 119, a part of the services platform 117, or included within the user terminals 109 and/or vehicles 107.

In one embodiment, content providers 121a-121k (collectively referred to as content providers 121) may provide content or data (e.g., including geographic data, parametric representations of mapped features, etc.) to the geographic database 115, the machine learning system 101, the navigation platform 111, the plane detection model 103a, the services platform 117, the services 119, the user terminals 109, the vehicles 107, and/or a client 123 executing on the user terminals 109. The content provided may be any type of content, such as map content, textual content, audio content, video content, image content, etc. In one embodiment, the content providers 121 may provide content that may aid in the detecting and classifying of lane lines and/or other features in image data and estimating the quality of the detected features. In one embodiment, the content providers 121 may also store content associated with the geographic database 115, the machine learning system 101, the navigation platform 111, the plane detection model 103a, the services platform 117, the services 119, the user terminals 109, and/or the vehicles 107. In another embodiment, the content providers 121 may manage access to a central repository of data, and offer a consistent, standard interface to data, such as a repository of the geographic database 115.

In one embodiment, the user terminals 109 may execute a software annotation client 123 to generate training data to train machine learning models according to the embodiments described herein. By way of example, the client 123 may also be any type of application that is executable on the user terminals 109, such as autonomous driving applications, mapping applications, location-based service applications, navigation applications, content provisioning services, camera/imaging application, media player applications, social networking applications, calendar applications, and the like. In one embodiment, the client 123 may act as a client for the machine learning system 101, the navigation platform 111, and/or plane detection model 103a and perform one or more functions associated with providing a machine learning model for identifying planar region(s) in an image alone or in combination with the machine learning system 101.

By way of example, the user terminals 109 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the user terminals 109 can support any type of interface to the user (such as "wearable" circuitry, etc.). In one embodiment, the user terminals 109 may be associated with the vehicles 107 or be a component part of the vehicles 107.

In one embodiment, the user terminals 109 and/or vehicles 107 are configured with various sensors for generating or collecting environmental image data (e.g., for processing by the machine learning system 101, the navigation platform 111, and/or the plane detection model 103a), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the user terminals 109 and/or vehicles 107 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the user terminals 109 and/or vehicles 107 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the user terminals 109 and/or vehicles 107 may include GPS or other satellite-based receivers to obtain geographic coordinates from satellites 125 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 101, the navigation platform 111, the plane detection model 103a, the services platform 117, the services 119, the user terminals 109, the vehicles 107, and/or the content providers 121 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
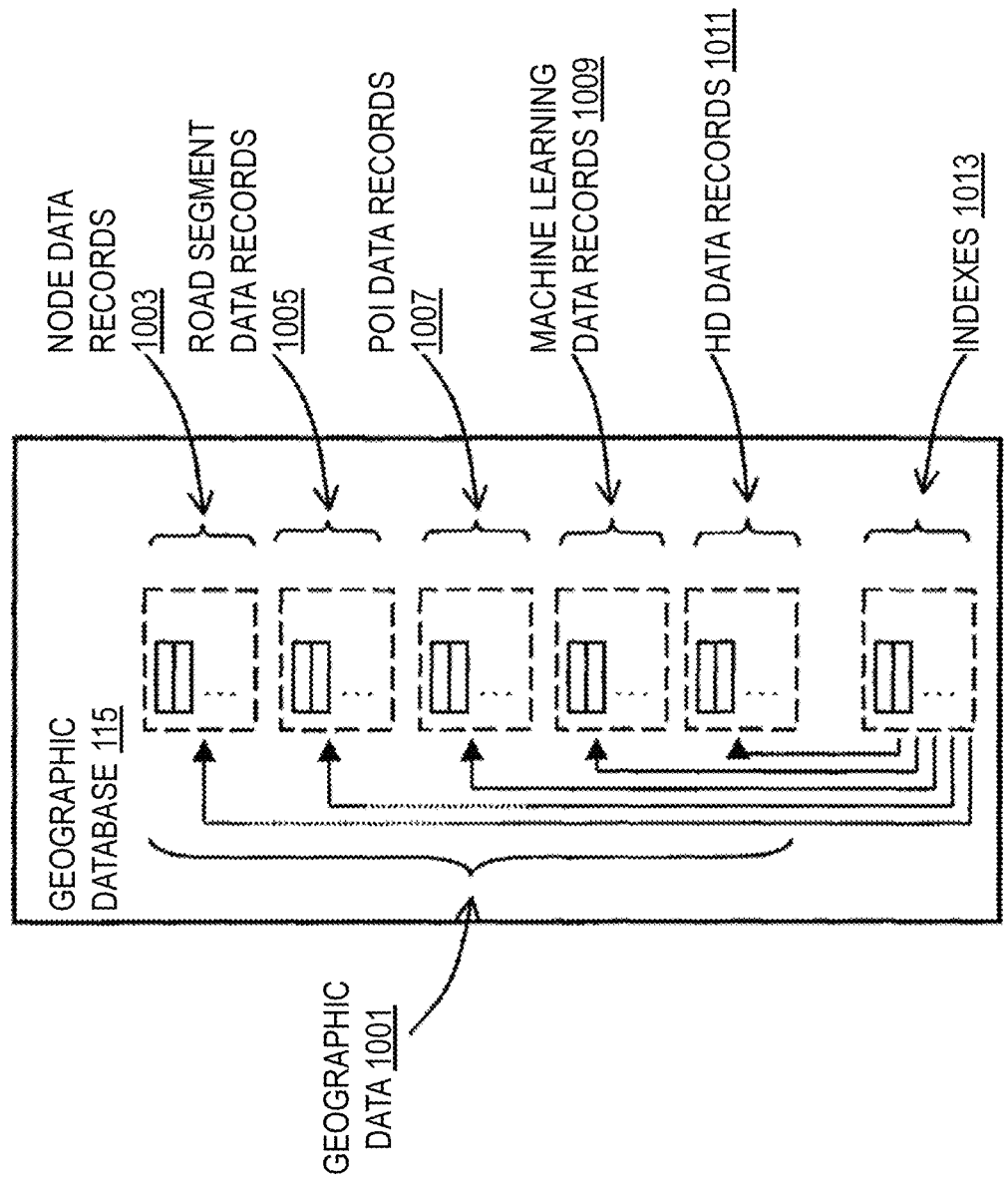
FIG. 10 is a diagram of a geographic database, according to one embodiment.

FIG. 10 is a diagram of a geographic database (such as the database 115), according to one embodiment. In one embodiment, the geographic database 115 includes geographic data 1001 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 1003, road segment or link data records 1005, POI data records 1007, machine learning data records 1009, HD mapping data records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 115. In one embodiment, the indexes 1013 may be used to quickly locate data without having to search every row in the geographic database 115 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 1007. The geographic database 115 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 115 can also include machine learning data records 1009 for storing training data, prediction models, annotated observations, computed featured distributions, sampling probabilities, and/or any other data generated or used by the system 100 according to the various embodiments described herein. By way of example, the machine learning data records 1009 can be associated with one or more of the node records 1003, road segment records 1005, and/or POI data records 1007 to support localization or visual odometry based on the features stored therein and the corresponding estimated quality of the features. In this way, the records 1009 can also be associated with or used to classify the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1011 are divided into spatial partitions of varying sizes to provide HD mapping data to vehicles 107 and other end user devices with near real-time speed without overloading the available resources of the vehicles 107 and/or devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 117 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicles 107 and/or user terminals 109) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 107 or a user terminal 109, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a machine learning model for identifying planar region(s) in an image may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
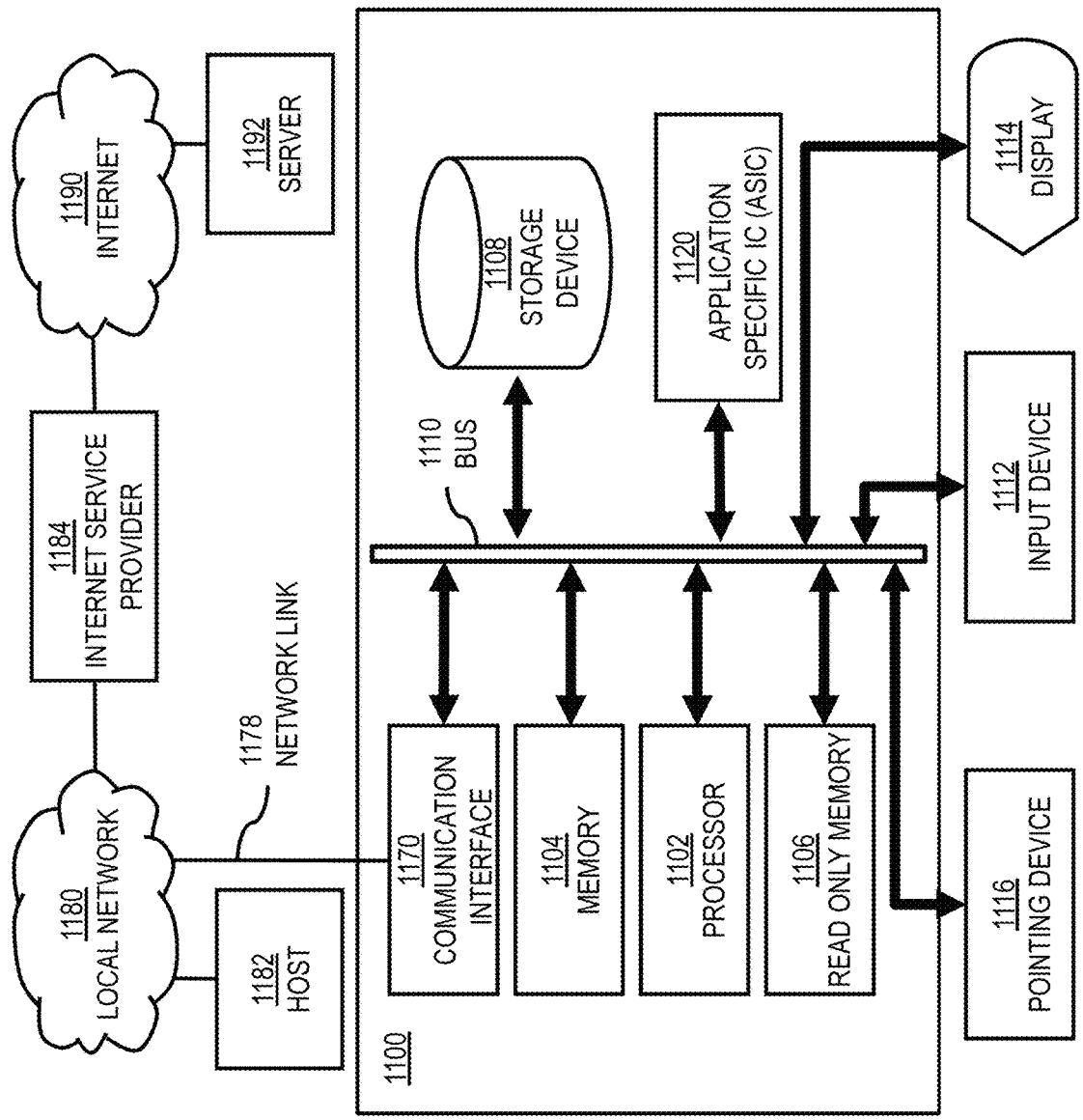
FIG. 11 is a diagram of hardware that can be used to implement an embodiment of the invention.

FIG. 11 illustrates a computer system 1100 upon which an embodiment of the invention may be implemented. Computer system 1100 is programmed (e.g., via computer program code or instructions) to provide a machine learning model for identifying planar region(s) in an image as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing a machine learning model for identifying planar region(s) in an image. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing a machine learning model for identifying planar region(s) in an image. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk, or flash card, for storing information, including instructions, that persists even when the computer system 1100 is turned off or otherwise loses power.

Information, including instructions for providing a machine learning model for identifying planar region(s) in an image, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 113 for providing a machine learning model for identifying planar region(s) in an image to the user terminal 109.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide a machine learning model for identifying planar region(s) in an image as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a machine learning model for identifying planar region(s) in an image. The memory 1205 also stores the data associated with or generated by the execution of the inventive steps.

Figure 13:
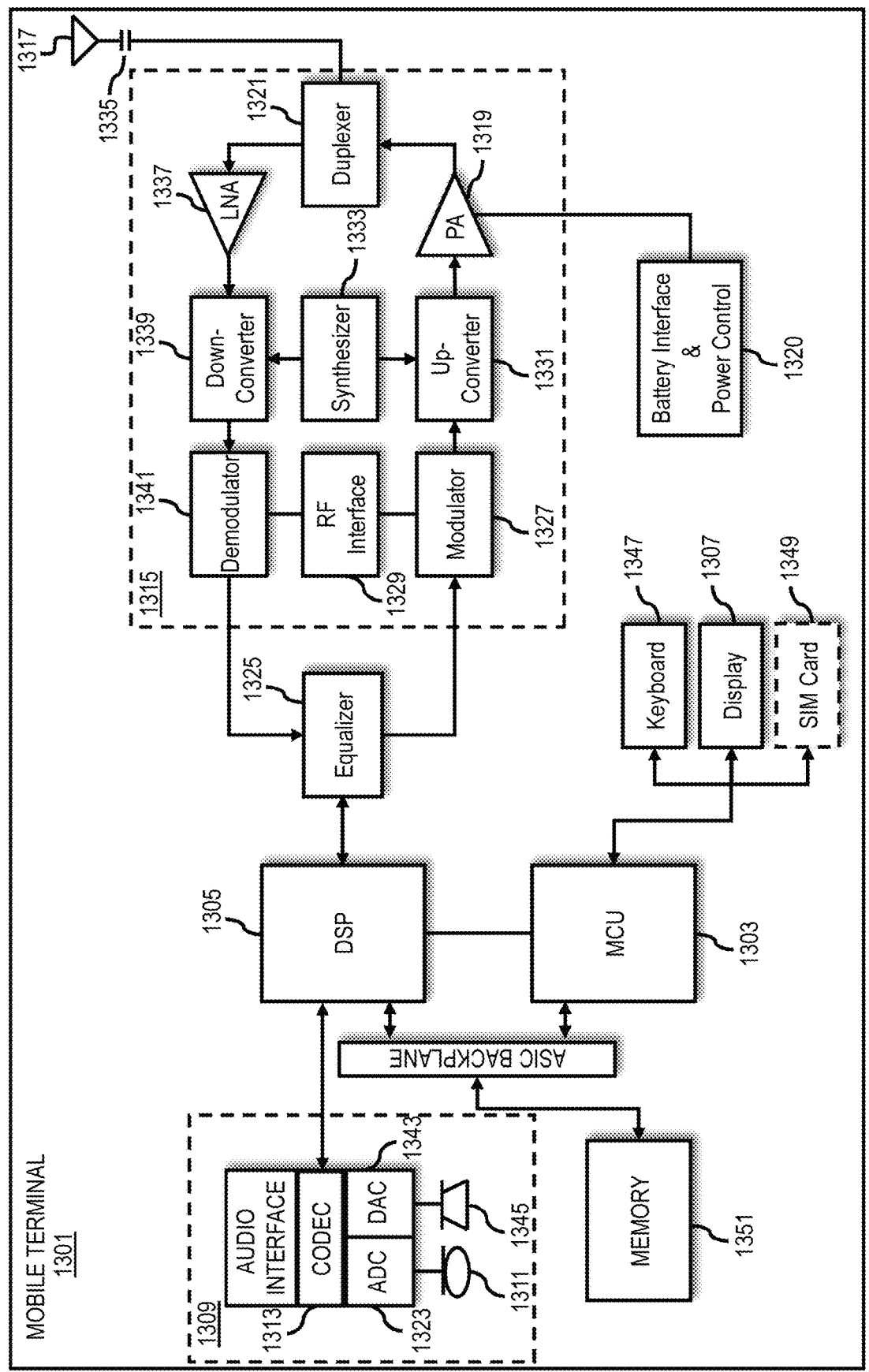
FIG. 13 is a diagram of a mobile terminal that can be used to implement an embodiment of the invention.

FIG. 13 is a diagram of exemplary components of a mobile terminal 1301 (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide a machine learning model for identifying planar region(s) in an image. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining a model for performing image segmentation to identify one or more planar regions of an image, wherein the model comprises at least:
      a trainable Gaussian filter that convolves the image to generate an input volume comprising a projection of the image at a plurality of different resolution scales; wherein the same trainable Gaussian filter is used in succession to generate a plurality of images of different resolution scales; and
      one or more features to identify one or more image regions having a texture within a similarity threshold;
   processing the image using the model by generating the input volume from the image using the trainable filter and extracting the one or more features from the input volume to determine the one or more regions having the texture within the similarity threshold;
   determining the one or more planar regions of the image by clustering the one or more image regions;
   generating a planar mask based on the one or more planar regions; and
   providing the planar mask as an output of the image segmentation.

2. The method of claim 1, wherein the trainable filter is a Gaussian filter, and wherein each scale of the plurality of different resolution scales differs with respect to a blurriness level.

3. The method of claim 1, wherein the trainable filter is a single depthwise convolutional filter repeated across one or more neural network layers of the model.

4. The method of claim 1, wherein one or more outputs of the trainable filter are resized using a nearest-neighbor interpolation to match a spatial resolution of the image.

5. The method of claim 1, further comprising:
   performing a channelwise concatenation of one or more outputs of the trainable filter to produce the input volume from which the one or more features are extracted to determine the one or more image regions having a texture within a similarity threshold.

6. The method of claim 1, further comprising:
   constructing an image-patch to vector mapping of the image based on the one or more features,
   wherein the one or more image regions are identified based on the image-patch to vector mapping.

7. The method of claim 1, wherein the one or more planar regions of the image are determined further based on a nearest neighbor matching.

8. The method of claim 1, wherein the model is a trained machined learning model trained through at least one source.

9. The method of claim 8, wherein the at least one source includes a first source and a second source, wherein the first source is a final output from one or more convolutional layers of the model, and wherein the second source is the planar mask.

10. The method of claim 1, wherein the trainable filter is an unsupervised module that provides one or more ingesting outputs to a supervised module of the model.

11. The method of claim 10, wherein a respective custom loss function for the one or more ingesting outputs is used to train the supervised module.

12. The method of claim 1, wherein the model is a supervised model.

13. The method of claim 1, wherein the model is an unsupervised model.

14. An apparatus for providing a machine learning model for identifying planar region(s) in an image, comprising:
   at least one processor; and
   at least one memory including computer program code for one or more programs,
   the at least one memory and the computer program code configured to, with the at least one processor, cause the apparatus to perform at least the following,
      determine a model for performing image segmentation to identify one or more planar regions of an image, wherein the model comprises at least:
         a trainable Gaussian filter that convolves the image to generate an input volume comprising a projection of the image at a plurality of different resolution scales; wherein the same trainable Gaussian filter is used in succession to generate a plurality of images of different resolution scales; and
         one or more features to identify one or more image regions having a texture within a similarity threshold;
      process the image using the model by generating the input volume from the image using the trainable filter and extracting the one or more features from the input volume to determine the one or more regions having the texture within the similarity threshold;
      determine the one or more planar regions of the image by clustering the one or more image regions;
      generate a planar mask based on the one or more planar regions; and
      provide the planar mask as an output of the image segmentation.

15. The apparatus of claim 14, wherein the trainable filter is a Gaussian filter, and wherein each scale of the plurality of different resolution scales differs with respect to a blurriness level.

16. The apparatus of claim 14, wherein the trainable filter is a single depthwise convolutional filter repeated across one or more neural network layers of the model.

17. The apparatus of claim 14, wherein one or more outputs of the trainable filter are resized using a nearest-neighbor interpolation to match a spatial resolution of the image.

18. A non-transitory computer-readable storage medium for providing a machine learning model for identifying planar region(s) in an image, carrying one or more sequences of one or more instructions which, when executed by one or more processors, cause an apparatus to at least perform the following steps:
   determining a model for performing image segmentation to identify one or more planar regions of an image, wherein the model comprises at least:
      a trainable Gaussian filter that convolves the image to generate an input volume comprising a projection of the image at a plurality of different resolution scales; wherein the same trainable Gaussian filter is used in succession to generate a plurality of images of different resolution scales; and one or more features to identify one or more image regions having a texture within a similarity threshold;

processing the image using the model by generating the input volume from the image using the trainable filter and extracting the one or more features from the input volume to determine the one or more regions having the texture within the similarity threshold;

determining the one or more planar regions of the image by clustering the one or more image regions;

generating a planar mask based on the one or more planar regions; and providing the planar mask as an output of the image segmentation.

19. The computer-readable storage medium of claim 18, wherein the trainable filter is a Gaussian filter, and wherein each scale of the plurality of different resolution scales differs with respect to a blurriness level.

20. The computer-readable storage medium of claim 18, wherein the trainable filter is a single depthwise convolutional filter repeated across one or more neural network layers of the model.

* * * * *